(12) United States Patent
Whitworth et al.

(10) Patent No.: US 7,896,608 B2
(45) Date of Patent: Mar. 1, 2011

(54) THREE-VANED DRAG-TYPE WIND TURBINE

(75) Inventors: Art Whitworth, Winterset, IA (US);
Larry B. Claflin, Truro, IA (US)

(73) Assignee: Circle Wind Corp., Truro, IA (US)

( * ) Notice: Subject to any disclaimer, the term of this patent is extended or adjusted under 35 U.S.C. 154(b) by 827 days.

(21) Appl. No.: 11/770,122

(22) Filed: Jun. 28, 2007

(65) Prior Publication Data
US 2009/0003999 A1 Jan. 1, 2009

(51) Int. Cl.
*F03D 7/06* (2006.01)
(52) U.S. Cl. .............. 415/4.2; 416/197 A; 416/DIG. 9
(58) Field of Classification Search .............. 415/4.2; 416/197 R, 197 A, 242, DIG. 9, DIG. 7
See application file for complete search history.

(56) References Cited

U.S. PATENT DOCUMENTS

| | | | | |
|---|---|---|---|---|
| 1,224,049 A | * | 4/1917 | Williamson | 415/4.4 |
| 1,367,766 A | * | 2/1921 | Bozied | 416/185 |
| 2,252,788 A | * | 8/1941 | Sparr | 416/197 R |
| 4,031,405 A | * | 6/1977 | Asperger | 290/55 |
| 4,359,311 A | * | 11/1982 | Benesh | 416/197 A |
| 4,362,470 A | * | 12/1982 | Locastro et al. | 416/197 A |
| 5,494,407 A | | 2/1996 | Benesh | |
| 6,283,711 B1 | | 9/2001 | Borg | |
| 7,008,171 B1 | | 3/2006 | Whitworth | |
| 7,220,107 B2 | | 5/2007 | Kaneda | |

* cited by examiner

*Primary Examiner* — Edward Look
*Assistant Examiner* — Dwayne J White
(74) *Attorney, Agent, or Firm* — Sturm & Fix LLP

(57) ABSTRACT

A novel three-vaned, drag-type wind turbine, wherein air, when it exits a first vane, is split into two flow paths. A first path is directed to a second vane, while a second path is directed to a third vane. The air, then, impinges on a plurality of vanes wherein the momentum of the air is altered, thus providing the force needed to drive the wind turbine. In a first embodiment, a wind shield is used to deflect a portion of the wind from entering the wind turbine, this portion being in a region where the vanes are rotating into the wind. In second embodiment, the wind shield is not used.

18 Claims, 10 Drawing Sheets

THREE-VANED DRAG-TYPE WIND TURBINE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an alternate source of energy. More particularly the present invention relates to a three-vaned, drag-type wind turbine rotor for converting kinetic energy in the wind to shaft power.

2. Background Art

Wind turbines have a long and varied history. Windmills in The Netherlands were first used for grist, and later converted to raising water above sea level for land reclamation. In the late $19^{th}$ and $20^{th}$ centuries, wind power was commonly harnessed across the prairie and plains states in the U.S. for pumping water from wells. Also in the early part of the $20^{th}$ century, wind was utilized for converting kinetic energy to electrical energy.

The last quarter of the $20^{th}$ century saw a marked increase in interest in converting wind energy to shaft power. Many units from that era were horizontal shaft wind turbines using airfoils of various types. Drawbacks of such an arrangement are the need to have the power unit (generator, air compressor, etc.) on top of the tower with the airfoils, or the need for gearing to transfer the power toward the ground.

Efforts have been made toward improving vertical-shaft wind turbines as well. The Darius rotor utilizes airfoils in a fashion quite different than the horizontal shaft units. However, the Darius rotor is not self-starting, so a starting scheme is required.

The Savonius rotor is a self-starting, low-speed, drag-type wind turbine rotor. However, in its traditional form (see FIG. 1), the Savonius rotor is known to exhibit low efficiencies. It is a type of impulse turbine, as opposed to the reaction turbines having horizontal axes and the Darius rotor. Rotation of the Savonius rotor is effected through momentum transfer from the air. The momentum of the air changes as its path is curved by the vanes of the Savonius rotor. Momentum exchange occurs on entrance to the vanes and on exit from the vanes. The change in momentum with time results in forces that tend to turn the Savonius rotor on its axis of rotation.

A modification to the Savonius rotor of FIG. 1 was disclosed in U.S. Pat. No. 5,494,407. The blades of this invention have been altered from half-circles in cross-section as seen in FIG. 1 to the shape shown in FIG. 2, having a linear portion nearer the axis of rotation and a curved portion, which is substantially an arc of a circle tangent to the linear portion and tangent to the circle defining the rotor diameter.

Another modification to the Savonius rotor of FIG. 1 was disclosed in U.S. Pat. No. 6,283,711 wherein an additional, outer vane, is pivotally attached to the original, semicylindrical blade at the latter's leading edge.

A novel modification to the traditional Savonius rotor is shown in FIG. 3 wherein the vanes are reduced in size away from a vertical center such that they reach apexes at the top and bottom of the unit. Such a wind turbine can be made of light fabric material.

A modified Savonius rotor is disclosed in U.S. Pat. No. 7,008,171, which is herein incorporated by reference. In this modification of the Savonius rotor, illustrated in FIG. 4, the two vanes 410 form a single "S" shaped vane and channels 420 are provided, preferably along a lower edge of the vane 410 and extending at least halfway up the vane 410. Through the channel 420 is a flow path for the air to pass through the vane 410 from the convex portion of the vane 410 to the freestream. The exhaust channel 420 transitions from the vane 410 in a shape roughly similar to a cylinder diverging from the vane.

In all of the above prior art, two vanes are disclosed for each section of the respective drag-type, wind turbine rotor. Multiple sections may be stacked to increase power and enhance starting.

A three-vaned Savonius wind turbine rotor is disclosed in U.S. Pat. No. 7,220,107 and briefly illustrated in FIG. 5. The airflow through the vanes 510 of this device has the same characteristics as a two-vane Savonius rotor. As seen in FIG. 5, the incoming airflow impinges on a first vane 510, after which it is directed to a second vane 520 only.

The Savonius rotor and the rotor of the instant invention are referred to as "drag-type" wind turbines. In fact, each of the vanes is a drag-type device insofar as drag on the vanes is the force providing the torque to rotate the wind turbine. Drag is defined as the force imparted to an object by a fluid (the object moving relative to the fluid) in the direction of the relative motion of the object relative to the fluid. Drag is a subject of undergraduate fluid mechanics, and is well understood by those of ordinary skill in this art. Drag is discussed in virtually all undergraduate fluid mechanics texts, such as *Fundamentals of Fluid Mechanics* $5^{th}$ ed. by Munson, Young, and Okiishi; John Wiley and Sons; 2005; ISBN 978-0-471-67582-2, which is hereby incorporated in its entirety by reference.

The drag due to relative fluid motion toward a concave surface is generally greater than that of relative fluid motion toward a convex surface. Hence, the force of the wind on the concave surface of a Savonius rotor is greater than the same wind's force on the convex surface of the same Savonius rotor. Therefore, the net force resulting in the torque that turns the rotor against its load is due to drag.

There is a need, therefore, for a drag-type wind turbine having three vanes, each of the vanes providing a flow path wherein, when the air leaves a given vane, the air is divided up into two paths and impinges on both the other vanes before being exhausted.

BRIEF SUMMARY OF THE INVENTION

An object of the present invention is to provide a drag-type wind turbine having three vanes, each vane being made to divide the flow as it exits that vane, and thus impinge on both the other vanes.

Each of the three vanes in each section is identical to the other two vanes. Consider a first, second, and third vane in a single wind turbine section. The wind impinges on the first vane. The wind is turned in order to change its momentum so a force is applied to the vane according to Newton's second law. Each of the vanes is constructed such that, when the wind exits the first vane, the wind is divided to impinge on both the second and third vanes.

An additional object of the present invention is to provide a wind shield shielding a portion of an upstream side of the drag-type wind turbine. The wind shield is situated to block the wind on the side of the axis of rotation where the vanes rotate into the wind. Although the shape of the vanes is such that the drag the wind produces when impinging on the convex side of a vane is less than the drag produced by the wind impinging on the concave side of the vane, the drag resisting the rotation of the wind turbine can be reduced by this wind shield.

Other objects, advantages, and novel features of the present invention will become apparent from the following detailed description of the invention when considered in conjunction with the accompanying drawings.

DETAILED DESCRIPTION OF THE INVENTION

Figure 1:
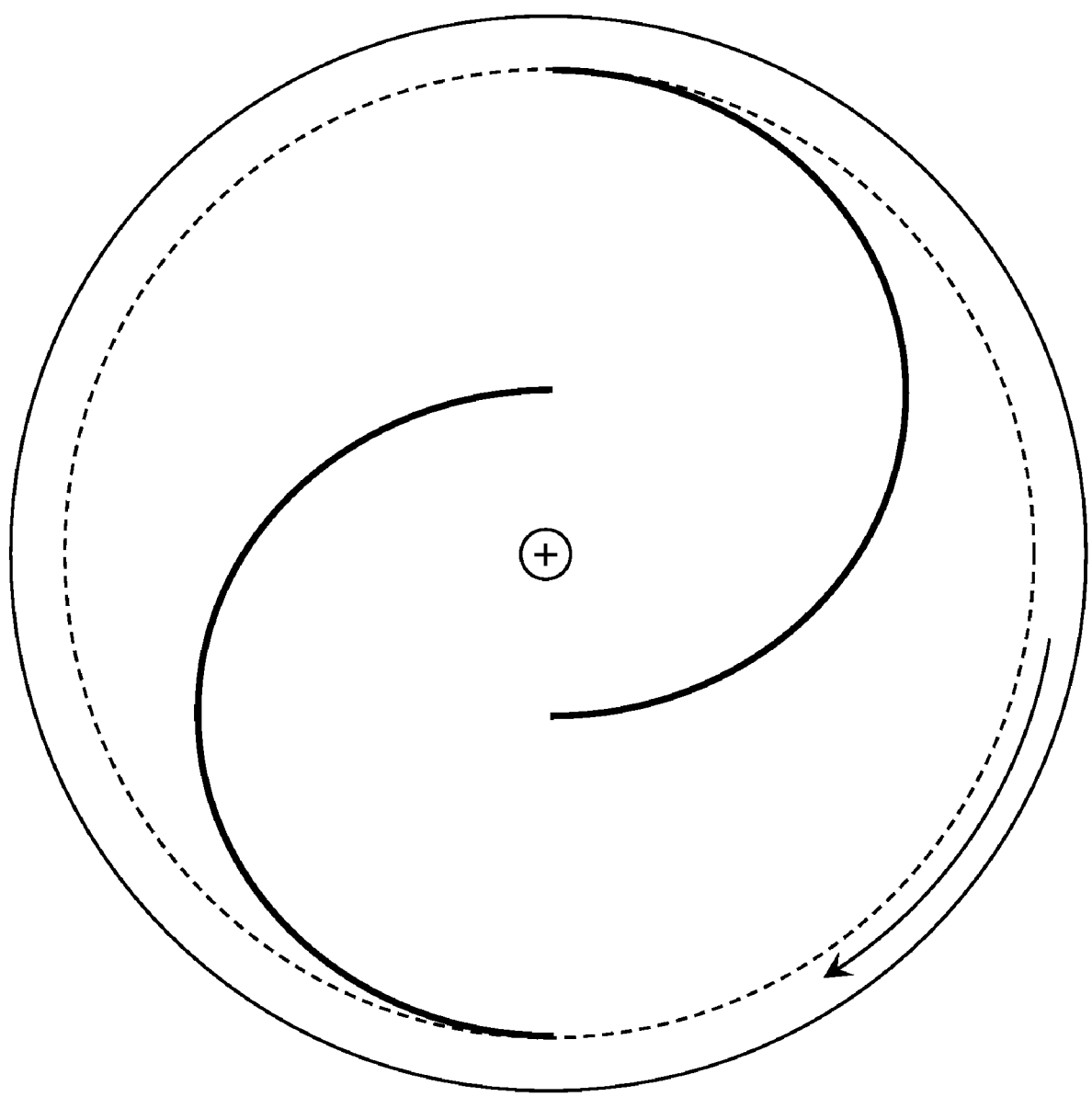
FIG. 1 is a plan view of a Savonius rotor of the prior art with semicylindrical vanes.
Figure 2:
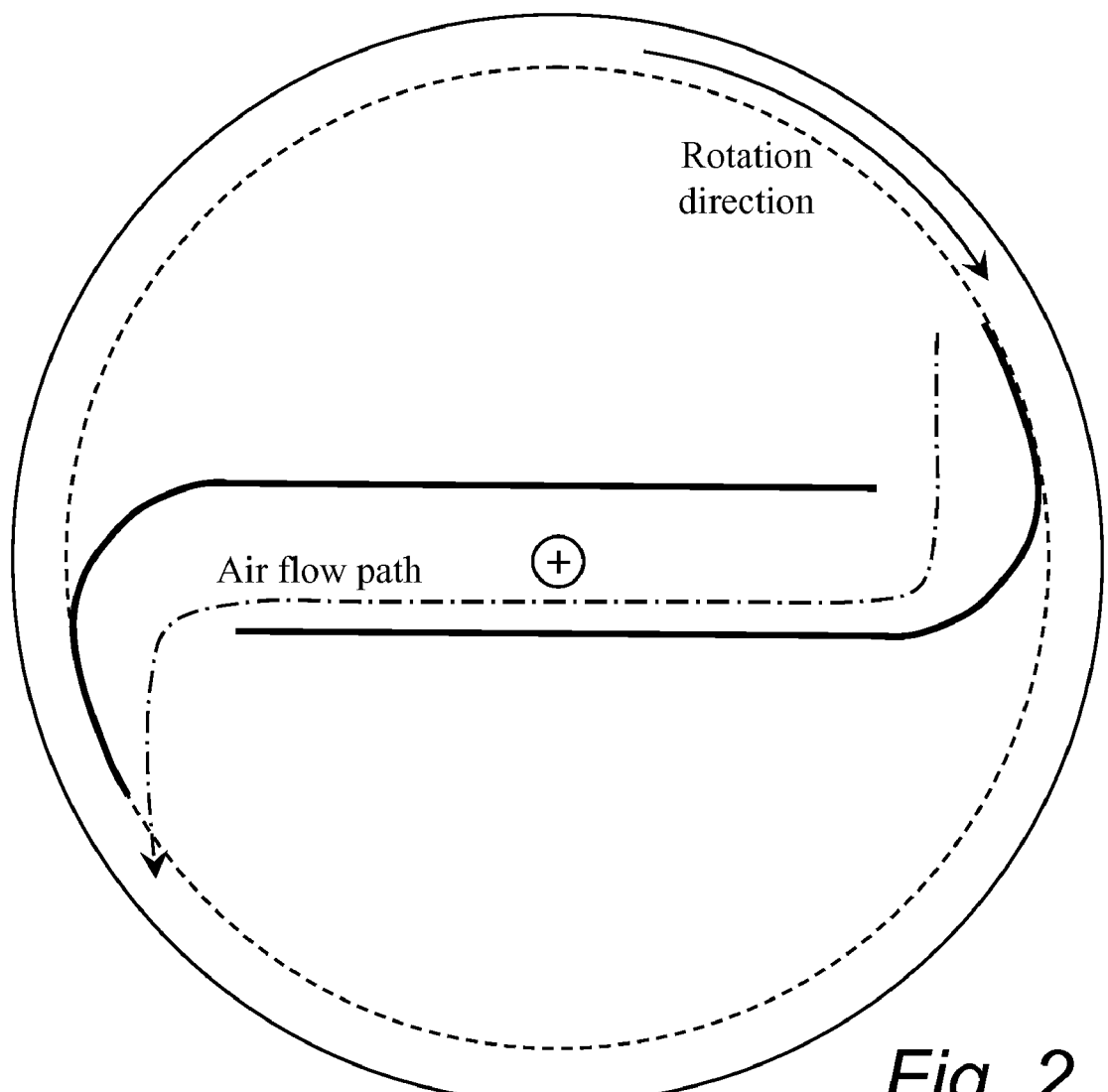
FIG. 2 is a plan view of a first modified Savonius rotor of the prior art.
Figure 3:
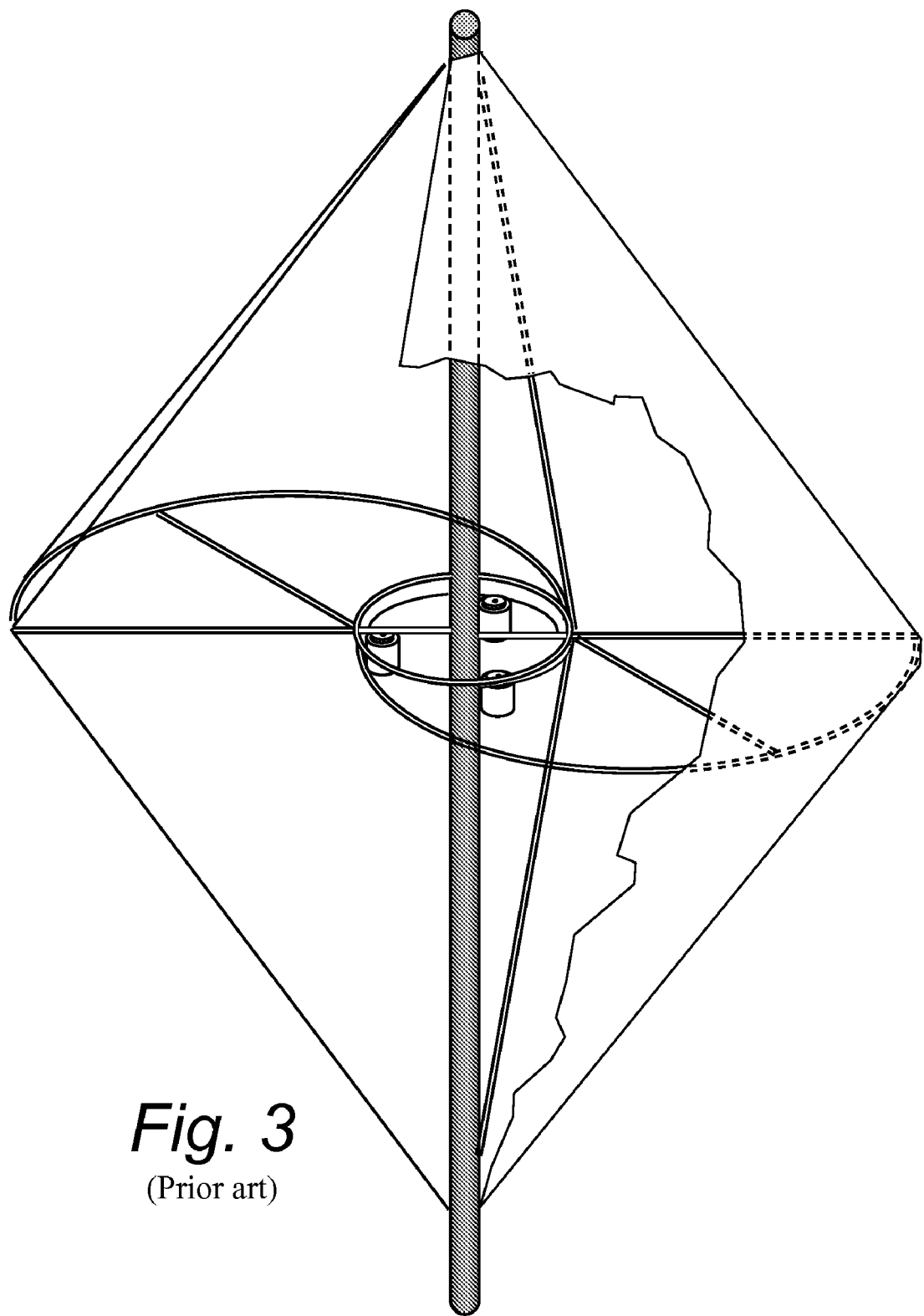
FIG. 3 is a plan view of a second modified Savonius rotor of the prior art.
Figure 4:
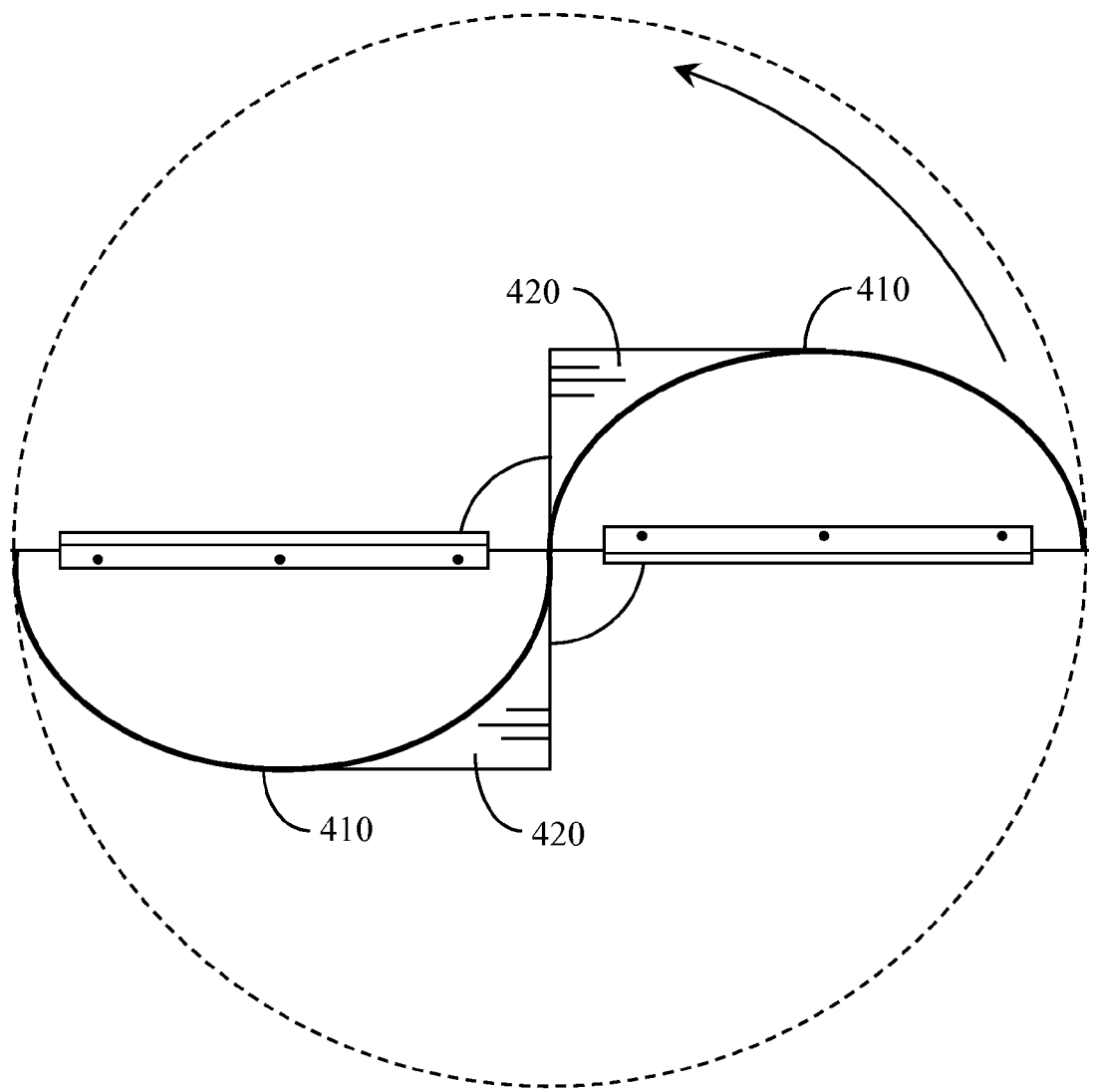
FIG. 4 is a plan view of a third modified Savonius rotor of the prior art.
Figure 5:
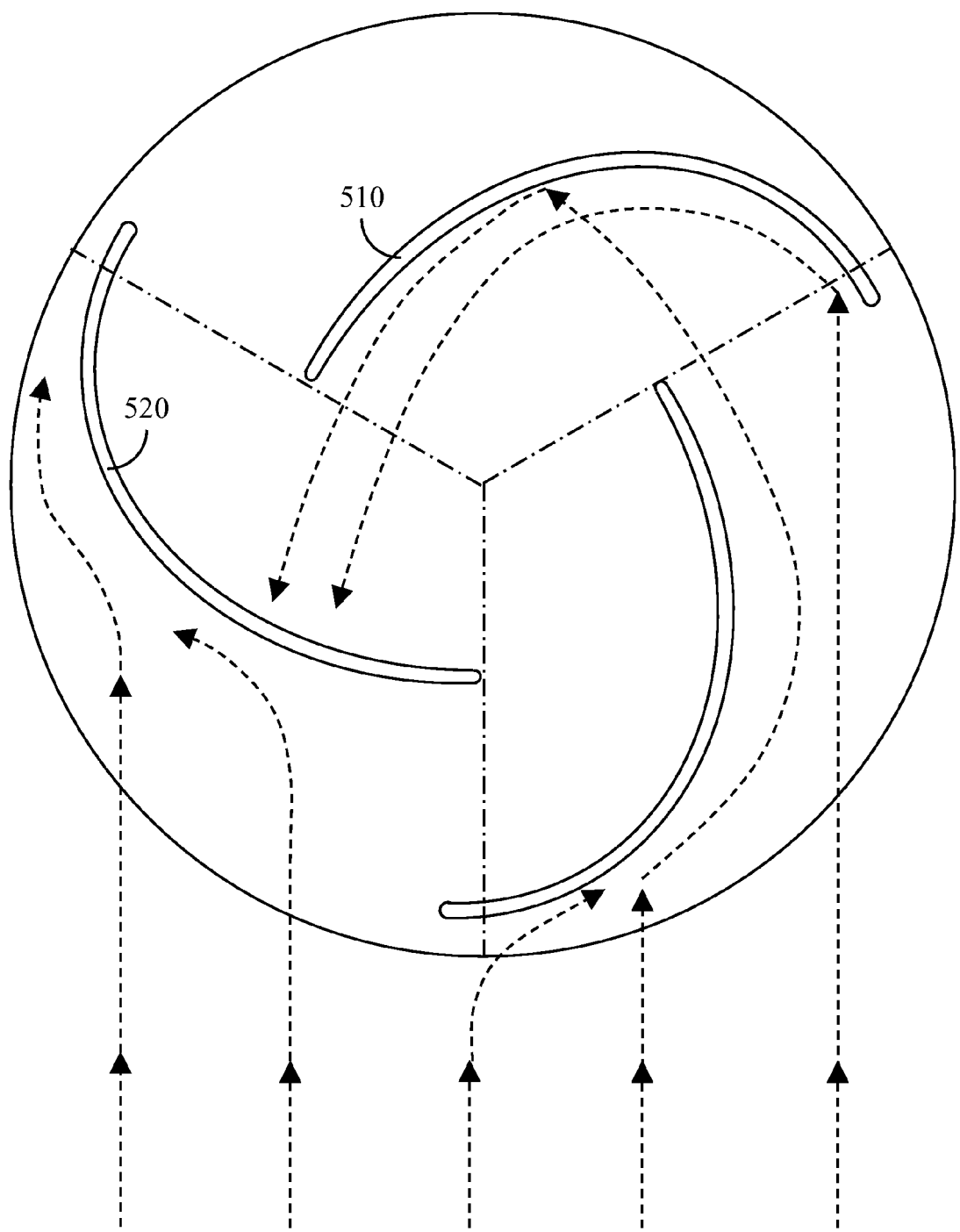
FIG. 5 is a top plan view of a three-vaned drag-type wind turbine of the prior art.
Figure 6:
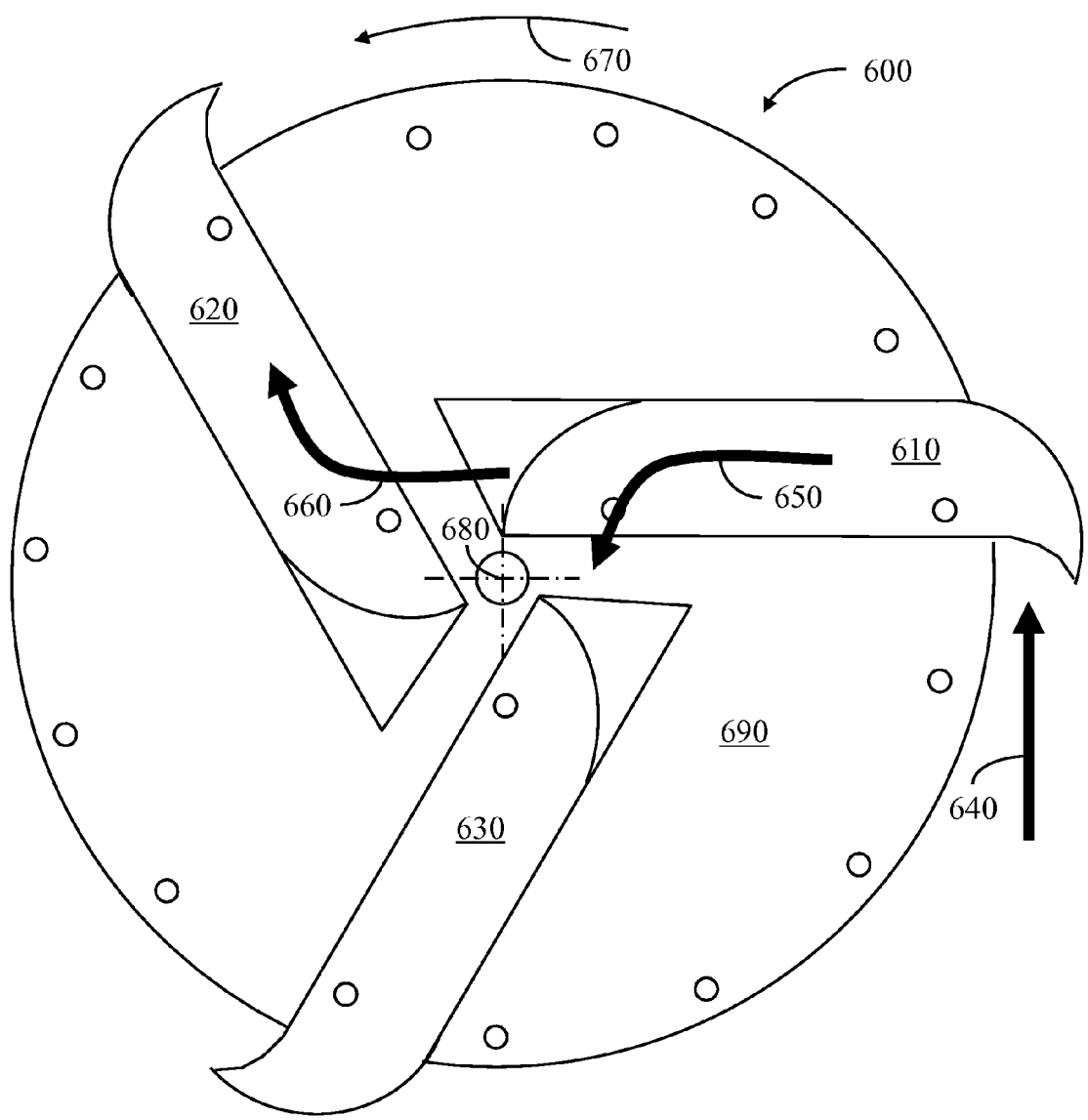
FIG. 6 is a first top plan view of the three-vaned drag-type wind turbine of the instant invention showing flow paths of the wind over a vane and between vanes.

The plan view shown in FIG. 6 shows a single section 600 having three vanes 610, 620, 630 of the three-vaned drag-type wind turbine of the instant invention. The arrows in FIG. 6 indicate trajectories 640, 650, 660 of airflow into and out of the first vane 610. In particular, the air discharged from the first vane 610 is split into two streams 650, 660. One stream 660 is directed to impinge on the second vane 620, while the other stream 650 is directed to impinge on the third vane 630.

Figure 7:
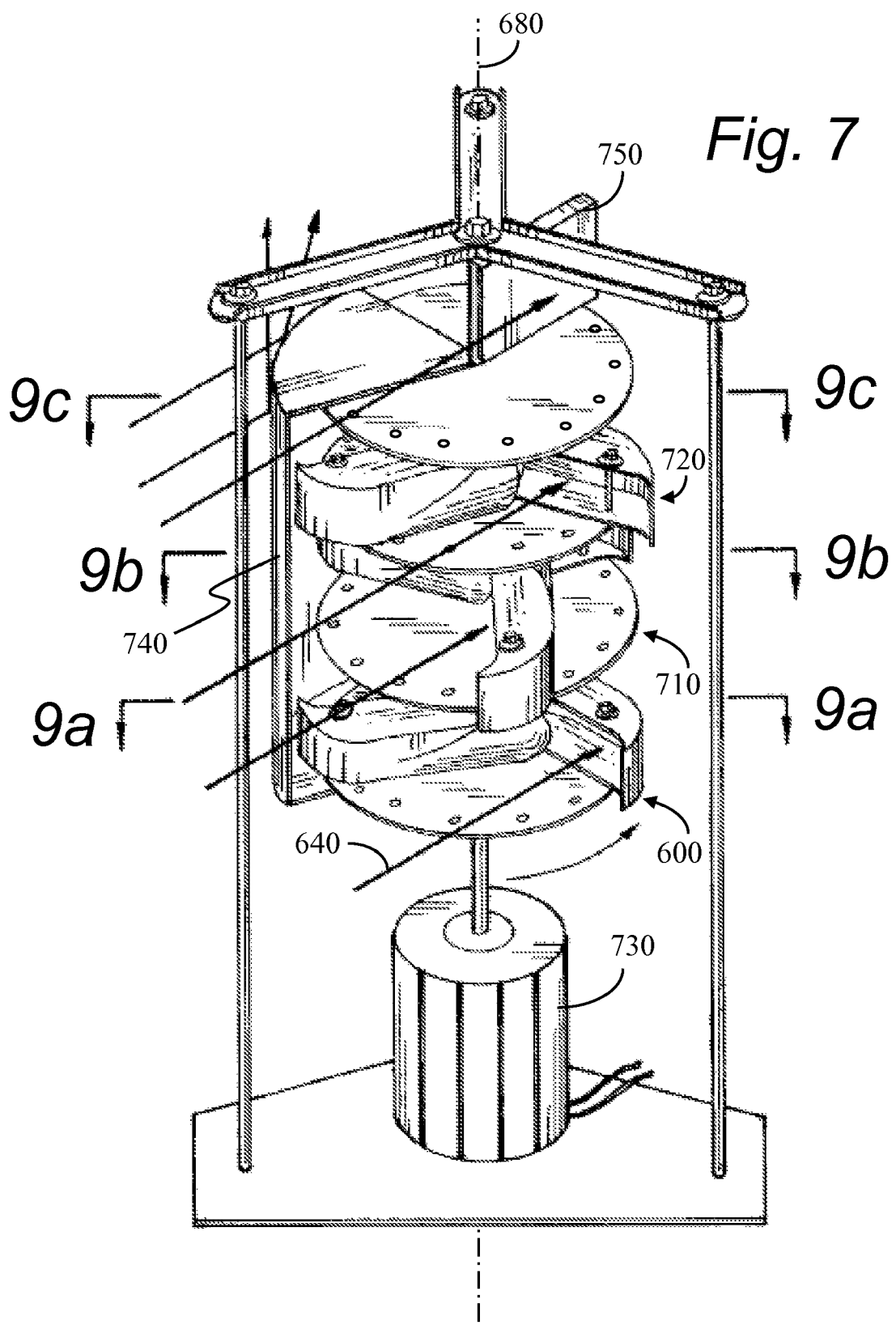
FIG. 7 is a perspective view of the three-vaned drag-type wind turbine assembly shown driving a generator.
Figure 8:
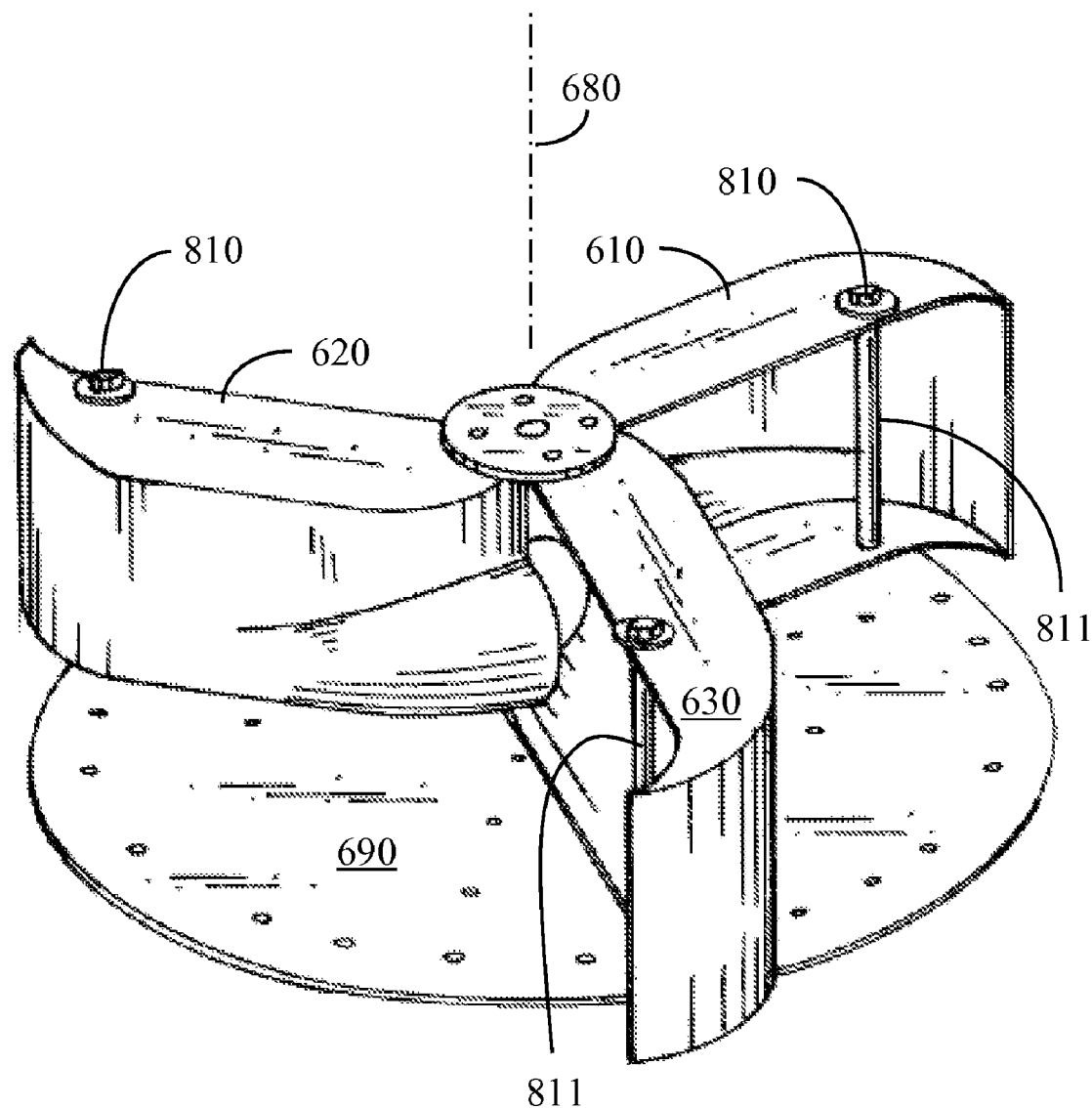
FIG. 8 is a perspective view of one section of a three-vaned drag-type wind turbine assembly of the instant invention.

The section 600 rotates in the direction 670 shown about an axis of rotation 680 (see also FIGS. 7 and 8).

The vanes 610, 620, 630 are affixed to a mounting plate 690, preferably by bolting with bolts 810 that, in conjunction with spacers 811, hold the plates 690 parallel to each other, as seen in FIG. 8. However, the vanes 610, 620, 630 may also be affixed to the plate 690 by welding, riveting, gluing, or by making the vanes 610, 620, 630 and the mounting plate 690 integral with one another. The present invention is not limited to a particular method for affixing the vanes 610, 620, 630 to the plate 690.

In FIG. 7, three sections 600, 710, 720 are stacked vertically. A section is hereby defined for the purposes of this document, including the claims, as an assembly, including three vanes, the plate 690, and all the appropriate fasteners to maintain the assembly. A section may include a bearing or the bearings may be distributed without respect for the sections 600, 710, 720. The orientation of the axis of rotation 680 is vertical in FIG. 7. However, the instant invention is not limited to a particular orientation of the axis of rotation 680.

Energy converted from the kinetic energy of the wind to shaft power is directed to a load 740, such as a generator, compressor, pump, line shaft, etc. One advantage of a vertical axis wind turbine is that the load 730 may be located at ground level for ease of installation, maintenance, and repair.

In a first embodiment of the invention, a wind shield 740 may be installed upstream of the wind turbine to deflect the wind from the side of the wind turbine where the vanes 610, 620, 630 rotate into the wind. That is, the vanes' linear velocity has a component opposite that of the freestream. In this manner, drag to the convex side 1010 (see FIG. 10) of the vanes 610, 620, 630 is lessened due to the air speed on the downstream side of the wind shield 740 being reduced compared to the wind speed.

The wind shield 740 is oriented toward the upstream side of the wind turbine by a tail 750, rigidly affixed to the wind shield 740.

Because the drag force due to the wind on the concave side 1110 (see FIG. 11) is greater than the drag on the convex side 1010 (see FIG. 10), the wind shield 740 is not strictly necessary. Therefore, in a second embodiment, the wind turbine is constructed and operated without the wind shield 740.

Figure 9A:
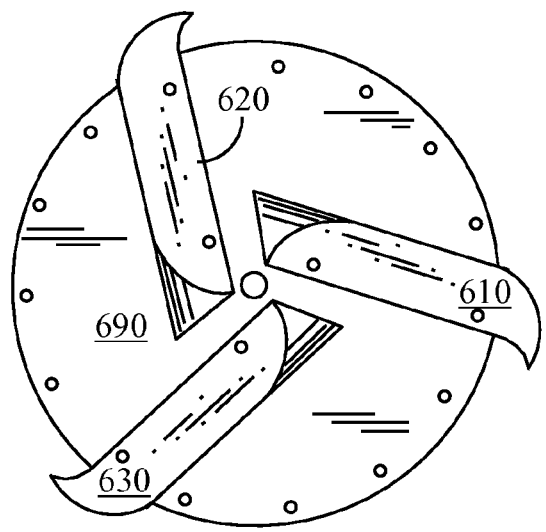
FIG. 9a is a top plan view of a first section of the three-vaned drag-type wind turbine.
Figure 9B:
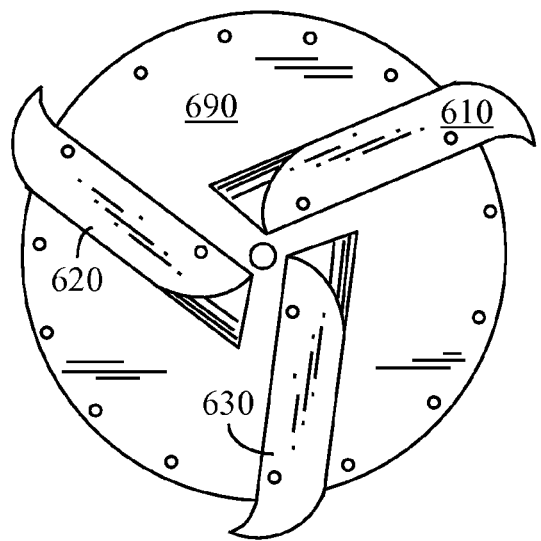
FIG. 9b is a top plan view of a second section of the three-vaned drag-type wind turbine.
Figure 9C:
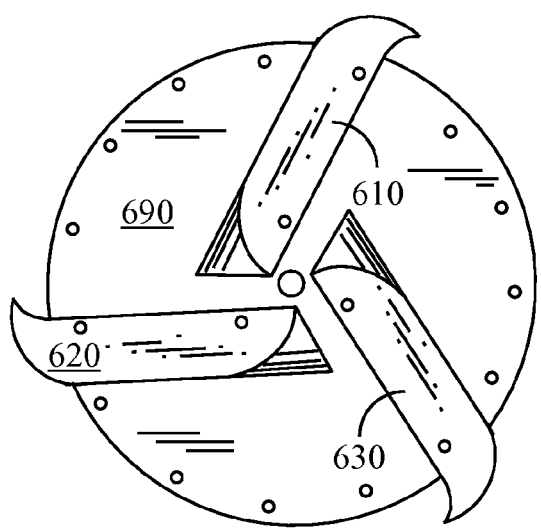
FIG. 9c is a top plan view of a third section of the three-vaned drag-type wind turbine.

The three sections 600, 710, 720 are arranged so they are rotated 40° with respect to one another, as is illustrated in FIGS. 9a-9c. In this fashion, every 40°, a vane 610, 620, 630 is present in one of the sections 600, 710, 720. Hence, startup is assured and the delivery of power to the load 730 is more consistent than if only one section 600, 710, 720 was being used.

Figure 10:
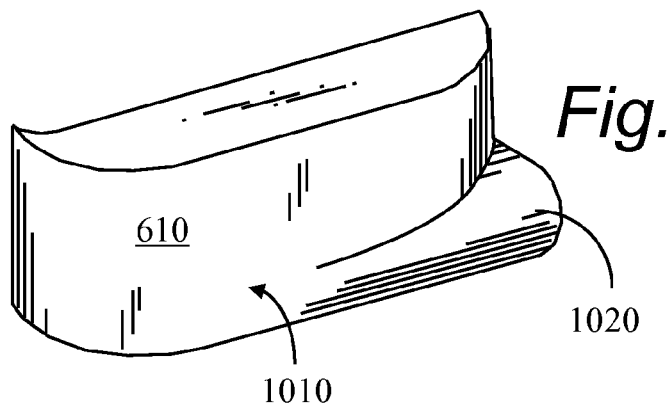
FIG. 10 is a perspective view, generally of a convex side of one vane of the three-vaned drag-type wind turbine.
Figure 11:
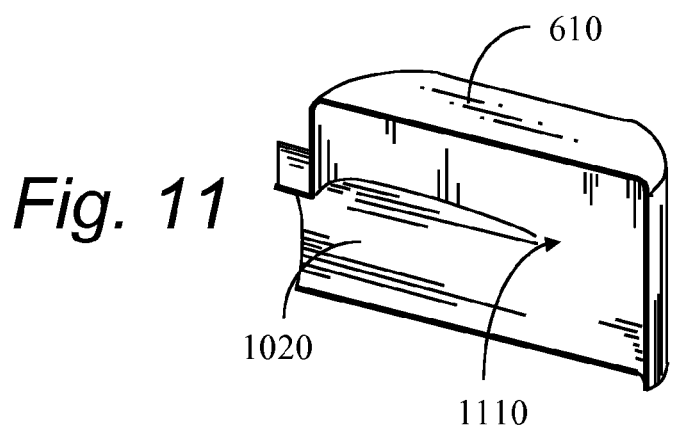
FIG. 11 is a perspective view, generally of a concave side of one vane of the three-vaned drag-type wind turbine.

The dividing of the wind exiting a vane 610, 620, 630 is effected by the presence of an exhaust channel 1020, shown clearly in FIGS. 10 and 11. Air closest to the mounting plate 690 passes through the exhaust channel and continues on a substantially straight course relative to the rotating section 600, 710, 720 as it leaves the first vane 610, as shown in FIG. 6. The trajectory of the air is bent by the second vane 620. Air in the first vane 610 and farther away from the mounting plate 690 is diverted by the curvature of the vane 610, and is directed to the third vane 630, as seen in FIG. 6.

Figure 12:
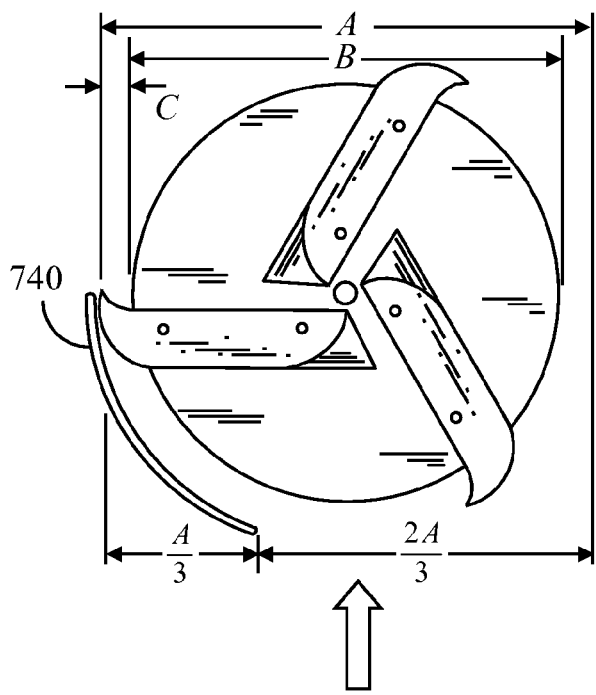
FIG. 12 is a top plan view of a single section of the three-vaned drag-type wind turbine indicating dimensions.

In FIG. 12, dimensions are indicated. A nominally-sized wind turbine would be constructed such that B=2 ft, C=1⅞ in, and thus, A=27¾ in. Those of ordinary skill in the art will readily realize the wind turbine may be successfully scaled up or down to meet the wind conditions and power needs of the particular load 730 being driven by the wind turbine.

FIG. 12 shows that, in the first embodiment of the invention, the wind shield 740 preferably extends across one third of the swept diameter, A. This corresponds to the shield extending through an angle $180° \leq \theta \leq 250.5°$, where 0° is at "3:00" according to mathematical convention. In other words, when looking in the direction the wind is blowing, the wind shield 740 preferably covers approximately one third of the diameter of an imaginary circle formed when an outermost portion of one of the first, second, and third drag-type wind turbine vanes 610, 620, 630 makes one revolution about the rotational axis. That way the wind does not, for the most part, blow against the back side of the first, second, and third drag-type wind turbine vanes 610, 620, 630, which would detract from the efficiency of the wind turbine. While it may seem that placing the shield 740 one-half of the way across the diameter would work best, it was empirically determined that the most efficient arrangement is to have the shield extend one-third of the way across the diameter A.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. An apparatus for converting kinetic energy from wind to shaft power, the apparatus comprising:
    (a) a first drag-type wind turbine vane disposed for rotation about a rotational axis;
    (b) a second drag-type wind turbine vane disposed for rotation about the rotational axis;
    (c) a third drag-type wind turbine vane disposed for rotation about the rotational axis;
    (d) an exhaust channel associated with the first drag-type wind turbine vane to divert a portion of the wind from the first drag-type wind turbine vane to the second drag-type wind turbine vane; and
    (e) a curved portion of the first drag-type wind turbine vane to divert a portion of the wind from the first drag-type wind turbine vane to the third drag-type wind turbine vane.

2. The apparatus of claim 1 additionally comprising a mounting plate to which the first drag-type wind turbine vane, the second drag-type wind turbine vane, and the third drag-type wind turbine vane are rigidly affixed to produce a section.

3. The apparatus of claim 2 wherein the first drag-type wind turbine vane is angularly separated from the second drag-type wind turbine vane by 120° and the second drag-type wind turbine vane is angularly separated from the third drag-type wind turbine vane by 120°.

4. The apparatus of claim 2 wherein a plurality of said sections, each comprising three drag-type wind turbine vanes, are stacked such that the plurality of sections all have a common axis of rotation.

5. The apparatus of claim 4 wherein the plurality of said sections comprises N sections, and further wherein the first drag-type wind turbine vane of a first section is rotated by 120/N degrees relative to a second section.

6. The apparatus of claim 1 additionally comprising a wind shield disposed to an upwind side of the wind turbine.

7. The apparatus of claim 6 wherein the wind shield is disposed substantially over 19.5° of a circumference outside a swept radius of the first, second, and third drag-type wind turbine vanes.

8. The apparatus of claim 6 wherein the wind shield is disposed to deflect the wind over a portion of the upwind side of the wind turbine where the first, second, and third drag-type wind turbine vanes travel toward an upwind direction.

9. The apparatus of claim 6 additionally comprising a tail, operatively affixed to the wind shield and disposed to cause the wind shield to be disposed on the upwind side of the wind turbine.

10. The apparatus of claim 6 additionally comprising:
    (a) a first axis of rotation about which the first, second, and third drag-type wind turbine vanes rotate; and
    (b) a second axis of rotation about which the wind shield rotates about, wherein the second axis of rotation is coincident with the first axis of rotation.

11. The apparatus of claim 6 wherein the wind shield is disposed substantially over approximately one third of the diameter of an imaginary circle formed when an outermost portion of one of the first, second, and third drag-type wind turbine vanes makes one revolution about the rotational axis.

12. A method of configuring a drag-type wind turbine for converting kinetic energy from wind to shaft power, the wind turbine comprising a first drag-type vane, a second drag-type vane, and a third drag-type vane, the method comprising:
    (a) arranging the first, second, and third drag-type vanes at 120° intervals symmetrically about an axis of rotation;
    (b) forming a concave side of the first drag-type vane;
    (c) forming a convex side of the first drag-type vane;
    (d) forming an exhaust channel in the first drag-type vane to direct air from the concave side of the first drag-type vane to the second drag-type vane; and
    (e) forming a curved surface on the concave side of the first drag-type vane to direct air from the concave side of the first drag-type vane to the third drag-type vane.

13. The method of claim 12 wherein arranging the first, second, and third drag-type vanes comprises operatively affixing the first, second, and third drag-type vanes to a mounting plate thus producing a section, said mounting plate disposed symmetrically about the axis of rotation.

14. The method of claim 13 additionally comprising:
    (a) producing a plurality of sections each comprising an additional three drag-type vanes operatively affixed to an additional mounting plate;
    (b) operatively adjoining the plurality of sections to one another wherein all the sections share the axis of rotation in common.

15. The method of claim 14 wherein the plurality of said sections comprises N sections, the method additionally comprising:
    (a) rotating a second section by 120/N degrees relative to a first section;
    (b) operatively, rigidly affixing the second section to the first section;
    (c) rotating each successive section by 120/N degrees relative to a previous section; and
    (d) operatively, rigidly affixing the successive section to the previous section.

16. The method of claim 14 wherein the plurality of sections consists of three sections.

17. The method of claim 12 additionally comprising:
    (a) operatively rotatably affixing a wind shield to the wind turbine wherein the wind shield has a second axis of rotation, said second axis of rotation being coincident with the axis of rotation of the first, second, and third drag-type vanes; and
    (b) disposing the wind shield on an upwind side of the wind turbine.

18. The method of claim 17 additionally comprising:
    (a) operatively, rigidly affixing a tail to the wind shield; and
    (b) disposing said tail to be engaged by the wind to keep the wind shield disposed on the upwind side of the wind turbine.

* * * * *